US012595858B2

(12) United States Patent     (10) Patent No.:   US 12,595,858 B2
Woods et al.     (45) Date of Patent:     Apr. 7, 2026

(54) INTEGRATED DOT PRESSURE PROTECTION VALVE

(71) Applicant: Parker-Hannifin Corporation, Cleveland, OH (US)

(72) Inventors: Andrew T. Woods, Kalamazoo, MI (US); Zackary Meisner, Paw Paw, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 38 days.

(21) Appl. No.: 18/591,370

(22) Filed: Feb. 29, 2024

(65) Prior Publication Data

US 2024/0353014 A1     Oct. 24, 2024

Related U.S. Application Data

(60) Provisional application No. 63/507,743, filed on Jun. 13, 2023, provisional application No. 63/496,982, filed on Apr. 19, 2023.

(51) Int. Cl.
    *F16K 15/06*        (2006.01)
    *F16K 1/32*         (2006.01)
(52) U.S. Cl.
    CPC .............. *F16K 15/063* (2013.01); *F16K 1/32* (2013.01)
(58) Field of Classification Search
    CPC ................................. F16K 15/063; F16K 1/32
    See application file for complete search history.

(56) References Cited

U.S. PATENT DOCUMENTS 5,113,900 A  *   5/1992   Gilbert .................. F16K 15/063
                                    137/542
5,327,853 A  *   7/1994   Hostetler ........... A01K 39/0213
                                    251/339

(Continued)

FOREIGN PATENT DOCUMENTS

CN         213017926 U     4/2021
GB           737198 A     9/1955

OTHER PUBLICATIONS

Pressure Protection Valve—Pressure Protection for Chassis Air Systems in the Truck and Trailer Market, Parker-Hannifin Corporation, Catalogue PDE2646SLUK, Aug. 2014.

*Primary Examiner* — Patrick C Williams
(74) *Attorney, Agent, or Firm* — Renner, Otto, Boisselle & Sklar, LLP

(57) ABSTRACT
A pressure protection valve provides more versatility and improved performance over conventional configurations. The pressure protection valve includes a valve body made of a first material (e.g., plastic) and having multiple integrated fluid connections. A valve base made of a second material (e.g., metal) is connected to the valve body at an inlet portion. A valve stem moves within the valve body to open and close the valve. Fluid connections, therefore, are integrated into the valve body with any suitable number and configuration, which therefore is adaptable with any desired valve base configuration. The valve stem is insertable through the inlet portion of the valve body during assembly, which permits overpressure protection to be blowout-proof. An internal side surface of a valve seat of the valve base, and a valve bore of the valve body through which the valve stem moves, have matched diameters to reduce hysteresis effects.

16 Claims, 3 Drawing Sheets

(56)           References Cited

U.S. PATENT DOCUMENTS

| | | | |
|---|---|---|---|
| 5,411,053 A | 5/1995 | Markham et al. | |
| 9,243,719 B1 | 1/2016 | Choate | |
| 9,353,876 B2 | 5/2016 | Woollenweber et al. | |
| 10,704,705 B2 | 7/2020 | Zlatintsis | |
| 2002/0170981 A1* | 11/2002 | Decker | F16K 15/063 |
| | | | 134/36 |
| 2003/0178068 A1* | 9/2003 | Simmons, Jr. | F15B 20/004 |
| | | | 137/538 |
| 2004/0060599 A1* | 4/2004 | Miyajima | F16K 15/026 |
| | | | 137/515 |
| 2005/0022882 A1* | 2/2005 | Berkman | E03B 7/10 |
| | | | 137/614.2 |
| 2006/0273276 A1* | 12/2006 | Moretti | F16K 15/18 |
| | | | 251/149.6 |
| 2007/0044848 A1* | 3/2007 | Norman | F16K 27/0209 |
| | | | 137/542 |
| 2021/0231224 A1* | 7/2021 | Sugino | F16K 15/026 |

* cited by examiner

INTEGRATED DOT PRESSURE PROTECTION VALVE

This application claims priority to U.S. Provisional Patent Application No. 63/496,982 filed Apr. 19, 2023, and U.S. Provisional Patent Application No. 63/507,743, filed Jun. 13, 2023, each of which is hereby incorporated herein by reference in its entirety.

FIELD OF INVENTION

The present application relates to pressure protection valves, such as for example pressure protection valves that are employed for pressure protection in vehicle brake systems.

BACKGROUND OF THE INVENTION

Pressure protection valves commonly are used for pressure protection in an operating fluid system. As a common and exemplary usage, a pressure protection valve may be used in a vehicle brake system on a commercial vehicle with air brakes. In connection with such usage, pressure protection valves must comply with standards set by the federal Department of Transportation (DOT), and therefore often are referred to as DOT pressure protection valves. In general, a pressure protection valve will isolate the air brake system's critical components at a high working pressure if the pressure in the brake system otherwise drops below a predefined threshold pressure. More particularly, the pressure protection valve closes to protect the system air supply pressure from dropping below the predefined threshold pressure, which assures brake integrity in the event of a reservoir system failure or leakage.

Conventional pressure protection valves typically employ a unitary or integrated valve housing that houses the operative portions of the valve. Such unitary valve housings typically are made of a metal material. As such, conventional valve housings are dedicatedly manufactured for a particular application, having a specific fluid port configuration. The need to dedicatedly manufacture such configurations requires complex and expensive machining which renders the overall valve structure more difficult to assemble, and results in a lack of versatility to accommodate multiple applications. Conventional unitary metal housings also can be subject to overtravel of an operating valve member in the opening direction, and a blowout type failure resulting from such overtravel of the valve member is a potential hazard of conventional configurations. Conventional pressure protection valves, therefore, are insufficiently versatile to provide a variety of connection configurations and attachments, can be difficult to assemble, and have performance issues relating to overtravel and blowout.

SUMMARY OF THE INVENTION

Embodiments of the pressure protection valve of the present application employ a dedicated valve body component, and a dedicated valve base component that is manufactured separately from the valve body component and that is subsequently connected into the valve body component. As further detailed below, by separating the valve body and the valve base into different components, the valve body can be tailored to a suitable output fluid connection configuration, and thus the valve base can be machined with any suitable threads or other connections features to accommodate any suitable configuration of valve body to provide more versatility to different applications.

In exemplary embodiments, the valve body is made of a plastic material, as compared to metal materials such as a zinc die cast material or other cast metals that are employed in conventional pressure protection valves. An example material suitable for embodiments of the present application is glass filled nylon as the valve body material. The use of such a plastic material, including for example a glass filled nylon material, renders the pressure protection valve lighter and easier to implement having smaller thread sizes as is useful for certain applications. In addition, the pressure protection valve body integrates the valve function with multiple fluid connections into a single valve body configuration. The use of a plastic valve body with a plurality of integrated fluid connections thus provides versatility in the number and configuration of fluid connections, and in particular a number and configuration of outlet connections, as any suitable configuration may be readily injection molded or otherwise formed from the plastic material for any particular application. The valve body defines an internal central bore that receives a valve stem that moves within the central bore for valve operation between an open position that permits fluid flow and a closed position that blocks fluid flow through the valve body.

The pressure protection valve further includes a valve base that is provided as a separate component from the valve body, and the valve base is connected to the valve body. In one exemplary embodiment, the valve body and the valve base include opposing mating threads, and the valve base is threaded into the valve body at an inlet portion of the valve body. The valve base typically is made of a metal material, and therefore a first material of the valve body differs from a second material of the valve base. The valve base has a valve seat that acts as a sealing surface that receives a sealing end of the valve stem when the valve stem is moved to the closed position. In an exemplary embodiment, such valve seat sealing surface has a diameter that is equal or matched to a diameter of the central bore of the valve body through which the valve stem moves. A benefit of such matched diameter configuration is that the opening pressure and closing pressure of the pressure protection valve will be as close to each other as is practicable, which reduces damaging hysteresis effects.

Performance further is enhanced by the molded valve body design allowing the valve stem to be inserted into the valve body from the threaded end at the inlet portion of the valve body prior to connection of the valve base. The valve stem being inserted from the threaded end of the valve body also allows for the configuration to have a blow-out proof valve stem, i.e., a configuration that prevents the valve stem from overtravel, or even ejection, in the event of an overpressure condition. In an exemplary embodiment, the valve body includes a hard stop, and the valve stem includes a lip that interacts against the hard stop to prevent the valve stem from overtravel in an opening direction if pressure exceeds the normal working pressure.

An aspect of the invention, therefore, is an enhanced pressure protection valve that provides more versatility and improved performance over conventional configurations. In exemplary embodiments, the pressure protection valve includes a valve body defining a central bore and that comprises a plurality of integrated fluid connections, the valve body being made of a first material; a valve base connected to the valve body at a first one of the plurality of integrated fluid connections, the valve base being made of a second material different from the first material; a valve stem that is moveable within the central bore of the valve body between an open position that permits fluid flow from the valve base through at least one additional fluid connection of the plurality of integrated fluid connections and a closed position that blocks fluid flow from the valve base through the at least one additional fluid connection of the plurality of integrated fluid connections, the valve base having a valve seat that receives a sealing end of the valve stem when the valve stem is in the closed position; and a spring located within the central bore opposite from the sealing end of the valve stem relative to the valve seat, and the spring biases the valve stem toward the closed position. The pressure protection valve may include one or more of the following features, either individually or in combination.

In an exemplary embodiment of the pressure protection valve, a diameter of the central bore is matched to a diameter of an internal side surface of the valve seat.

In an exemplary embodiment of the pressure protection valve, the valve body includes a hard stop and the valve stem includes a lip that interacts against the hard stop to prevent the valve stem from overtravel in an opening direction.

In an exemplary embodiment of the pressure protection valve, the first material includes a plastic material and the second material includes a metal material.

In an exemplary embodiment of the pressure protection valve, the first material includes a glass filed nylon material.

In an exemplary embodiment of the pressure protection valve, the second material includes brass.

In an exemplary embodiment of the pressure protection valve, the valve body and the valve base include opposing mating threads, and the valve base is threaded into the valve body.

In an exemplary embodiment of the pressure protection valve, the at least one additional fluid connection of the plurality of integrated fluid connections comprises multiple integrated fluid connections.

In an exemplary embodiment of the pressure protection valve, the at least one additional fluid connection of the plurality of integrated fluid connections comprises a push-to-connect fluid connection.

In an exemplary embodiment of the pressure protection valve, the valve further includes a retaining sleeve that caps the valve body opposite from the valve base.

In an exemplary embodiment of the pressure protection valve, the spring is a coil spring.

In an exemplary embodiment of the pressure protection valve, the valve further includes a first O-ring seal that seals an interface of the valve body and the valve base.

In an exemplary embodiment of the pressure protection valve, the valve further includes a second O-ring seal that seals an outer surface of the valve base.

In an exemplary embodiment of the pressure protection valve, the valve further includes a third O-ring that seals an interface of the valve stem and the central bore.

During an example assembly process, the valve body is capped with a retaining sleeve, and the compression spring is inserted into the central bore from the inlet portion side of the valve body. The valve stem then is inserted through the inlet portion side of the valve body into the central bore and against the compression spring. After the insertion of the valve stem into the valve body, the valve base is then threaded into or otherwise connected to the inlet portion of the valve body. As referenced above, installing the valve stem from the threaded end of the valve body permits the inclusion of the blow-out prevention features and matched diameters for the valve seat sealing surface and the valve body bore.

Another aspect of the invention, therefore, is a method of assembling a pressure protection valve. In exemplary embodiments, the method of assembling includes the steps of: forming a valve body defining a central bore and having a plurality of integrated fluid connections, the valve body being made of a first material; inserting a spring into the central bore through a first one of the plurality of integrated fluid connections; inserting a valve stem into the central bore through the first one of the plurality of integrated fluid connections; forming a valve base made of a second material different from the first material; and after inserting the valve stem into the central bore through the first one of the plurality of integrated fluid connections, connecting the valve base to the valve body at the first one of the plurality of integrated fluid connections, the spring biasing the valve stem toward the valve base. During valve operation the valve stem is moveable within the central bore of the valve body between an open position that permits fluid flow from the valve base through at least one additional connection of the plurality of integrated fluid connections and a closed position that blocks fluid flow from the valve base through the at least one additional connection of the plurality of integrated fluid connections, the valve base having a valve seat that receives a sealing end of the valve stem when the valve stem is in the closed position. In addition, during a pressure drop below a threshold pressure, the spring bias moves the valve stem to the closed position to maintain pressure at the first one of the plurality of integrated fluid connections (e.g., inlet portion) of the valve body. The method of assembling may include one or more of the following features, either individually or in combination.

In an exemplary embodiment of the method of assembling, the valve body and the valve base include opposing mating threads, and connecting the valve base to the valve body comprises threading the valve base into the valve body.

In an exemplary embodiment of the method of assembling, forming the valve body comprises injection molding a plastic material to form the valve body.

In an exemplary embodiment of the method of assembling, the plastic material includes glass filled nylon.

In an exemplary embodiment of the method of assembling, forming the valve base comprises forming the valve base from a metal material.

In an exemplary embodiment of the method of assembling, the metal material includes brass.

In an exemplary embodiment of the method of assembling, a diameter of the central bore is equal to a diameter of an internal side surface of the valve seat.

In an exemplary embodiment of the method of assembling, the valve body includes a hard stop and the valve stem includes a lip that interacts against the hard stop to prevent the valve stem from overtravel in an opening direction.

In an exemplary embodiment of the method of assembling, the method further includes capping the valve body with a retaining sleeve opposite from the valve base.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
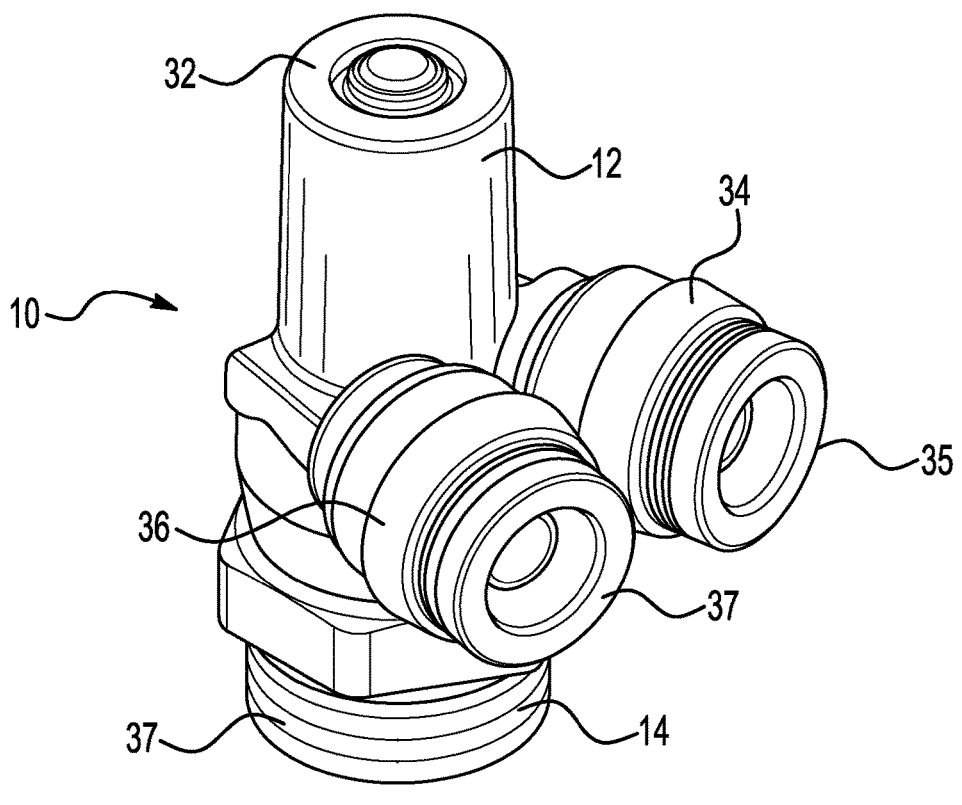
FIG. 1 is a drawing depicting an isometric or perspective view of an exemplary pressure protection valve in accordance with embodiments of the present application.

Embodiments of the present application will now be described with reference to the drawings, wherein like reference numerals are used to refer to like elements throughout. It will be understood that the figures are not necessarily to scale.

Figure 2:
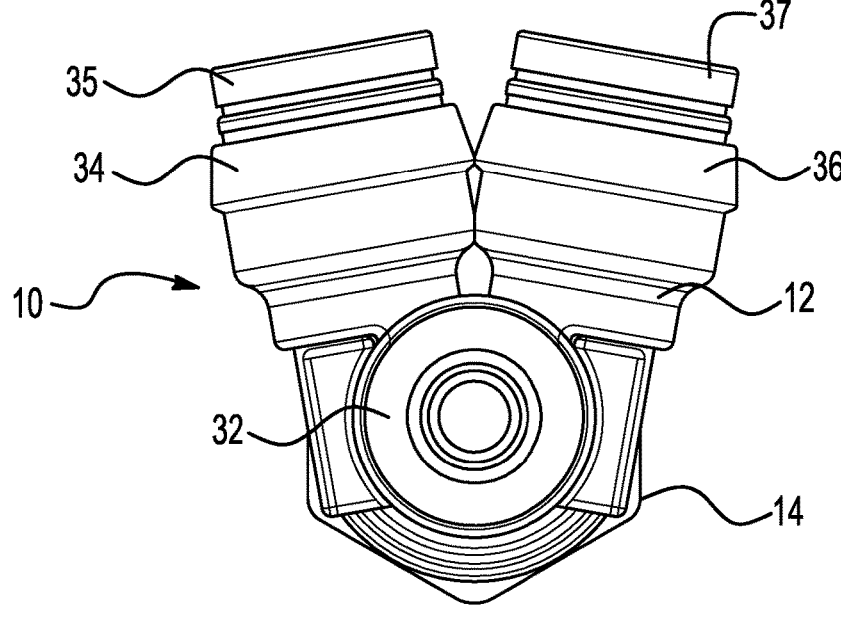
FIG. 2 is a drawing depicting a top view of the exemplary pressure protection valve of FIG. 1.
Figures 3, 4:
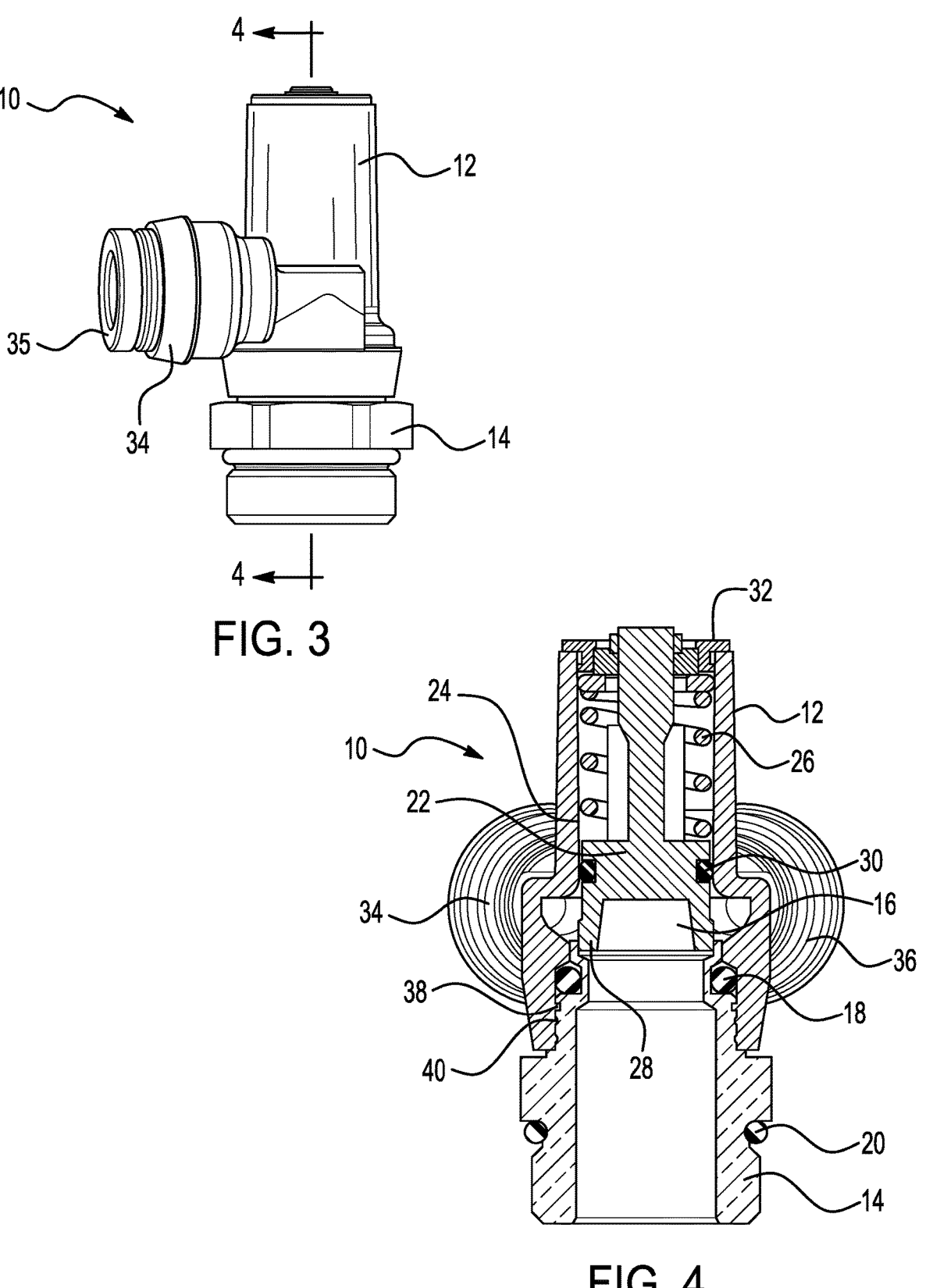
FIG. 3 is a drawing depicting a side view of the exemplary pressure protection valve of FIG. 1.
FIG. 4 is a drawing depicting a side cross-sectional view of the exemplary pressure protection valve taken along the line A-A shown in FIG. 3.

FIGS. 1-4 show various views of a pressure protection valve 10 according to embodiments of the present application. In particular, FIG. 1 is a drawing depicting an isometric or perspective view of the exemplary pressure protection valve; FIG. 2 is a drawing depicting a top view of the exemplary pressure protection valve; FIG. 3 is a drawing depicting a side view of the exemplary pressure protection valve; and FIG. 4 is a drawing depicting a side cross-sectional view of the exemplary pressure protection valve taken along the line A-A shown in FIG. 3. The pressure protection valve 10 includes a valve body 12 that is connected to a valve base 14 at an inlet port or inlet portion 16 (see particularly FIG. 4) of the valve body 12. The valve body 12 may be made of a plastic material, such as an injection molded plastic material, and for example may be made of a glass filled nylon material. The valve base 14 may be made of a metal material, for example brass. As seen in the cross-sectional view of FIG. 4, an interface of the valve body 12 and the valve base 14 may be sealed by a first O-ring seal 18. A second O-ring seal 20 seals an outer surface of the valve base when connected to an inlet fluid connection.

Again as best seen in the cross-sectional view of FIG. 4, the pressure protection valve 10 further includes a valve stem 22 that is moveable within an internal central bore 24 defined by the valve body 12 between an open position that permits fluid flow through the valve body and a closed position that blocks fluid flow through the valve body. In the closed position, the valve stem 22 interacts against a valve seat surface 28 of the valve base 14 that acts as a sealing surface to block fluid flow through the valve body. The valve stem 22 is operated by a spring 26, which may be a coil spring, and which biases the valve stem 22 toward the closed position against the valve seat surface 28 by which fluid flow through the valve body is blocked. Accordingly, when the pressure falls below a predefined threshold pressure, the coil spring 26 drives the valve stem 22 against the valve seat surface 28 of the valve base 14 to maintain pressure at the inlet side of the pressure protection valve 10 where critical operating components are located. For example, in the context of a vehicle, pressure is maintained for critical operating components, such as a brake, whereas pressure at the outlet integrated fluid connections to less critical components is permitted to drop.

A third O-ring seal 30 seals an interface of the valve stem 22 and the central bore 24 of the valve body 12. The valve body 12 is capped by a retaining sleeve 32 that maintains placement of the valve spring 26 and provides for appropriate spring compression.

Accordingly, the pressure protection valve 10 of the present application employs a dedicated valve body component that is made separately from a dedicated valve base component. As referenced above, in exemplary embodiments the valve body 12 is made of a plastic material, as compared to metal materials such as a zinc die cast material or other cast metals that are employed in conventional pressure protection valves having a unitary valve housing. The use of such a plastic material, including for example a glass filled nylon material, renders the pressure protection valve lighter and easier to implement having smaller thread sizes as is useful for certain applications.

In addition, the pressure protection valve body integrates the valve function with multiple fluid connections into a single valve body configuration. In the example depicted in FIGS. 1-4, in addition to the inlet port or inlet portion 16, the valve body includes two outlet portions 34 and 36 for downstream transmission of fluids received via the inlet portion 16, although any suitable number of fluid connections may be employed. The use of a plastic valve body with a plurality of integrated fluid connections thus provides versatility in the number and configuration of fluid connections, and in particular a number and configuration of outlet fluid connections, as any suitable configuration may be readily injection molded or otherwise formed from the plastic material for any particular application. For example, in the figures the outlet portions 34 and 36 are shown connected to two respective downstream fluid connections 35 and 37. In one example, the respective fluid outlet portions 34 and 36 of the pressure protection valve 10 may be push-to-connect fluid connections that are easily connectable to the downstream fluid connections 35 and 37. The valve stem 22 moves within the central bore 24 of the valve body for valve operation between an open position that permits fluid flow through the valve body from the inlet portion 16 to the outlet portions 34 and 36, and a closed position that blocks fluid flow through the valve body.

With the described configuration, the valve base 14 is provided as a separate component from the valve body 12, and thus the valve base is connected to the valve body by any suitable connection features. In one exemplary embodiment as shown in FIG. 4, the valve body and the valve base may include opposing mating threads 38 and 40, and the valve base 14 is threaded into the valve body 12 at the inlet portion 16 of the valve body. In exemplary embodiments as referenced above, the valve base 14 is made of a metal material, and therefore a first material of the valve body differs from a second material of the valve base. The valve base 14 has the valve seat surface 28 that acts as the sealing surface that receives a sealing end of the valve stem 22 when the valve stem is moved to the closed position.

An aspect of the invention, therefore, is an enhanced pressure protection valve that provides more versatility and improved performance over conventional configurations. In exemplary embodiments, the pressure protection valve includes a valve body defining a central bore and that comprises a plurality of integrated fluid connections, the valve body being made of a first material; a valve base connected to the valve body at a first one of the plurality of integrated fluid connections, the valve base being made of a second material different from the first material; a valve stem that is moveable within the central bore of the valve body between an open position that permits fluid flow from the valve base through at least one additional fluid connection of the plurality of integrated fluid connections and a closed position that blocks fluid flow from the valve base through the at least one additional fluid connection of the plurality of integrated fluid connections, the valve base having a valve seat that receives a sealing end of the valve stem when the valve stem is in the closed position; and a spring located within the bore opposite from the sealing end of the valve stem relative to the valve seat, and the spring biases the valve stem toward the closed position.

Figures 5, 6:
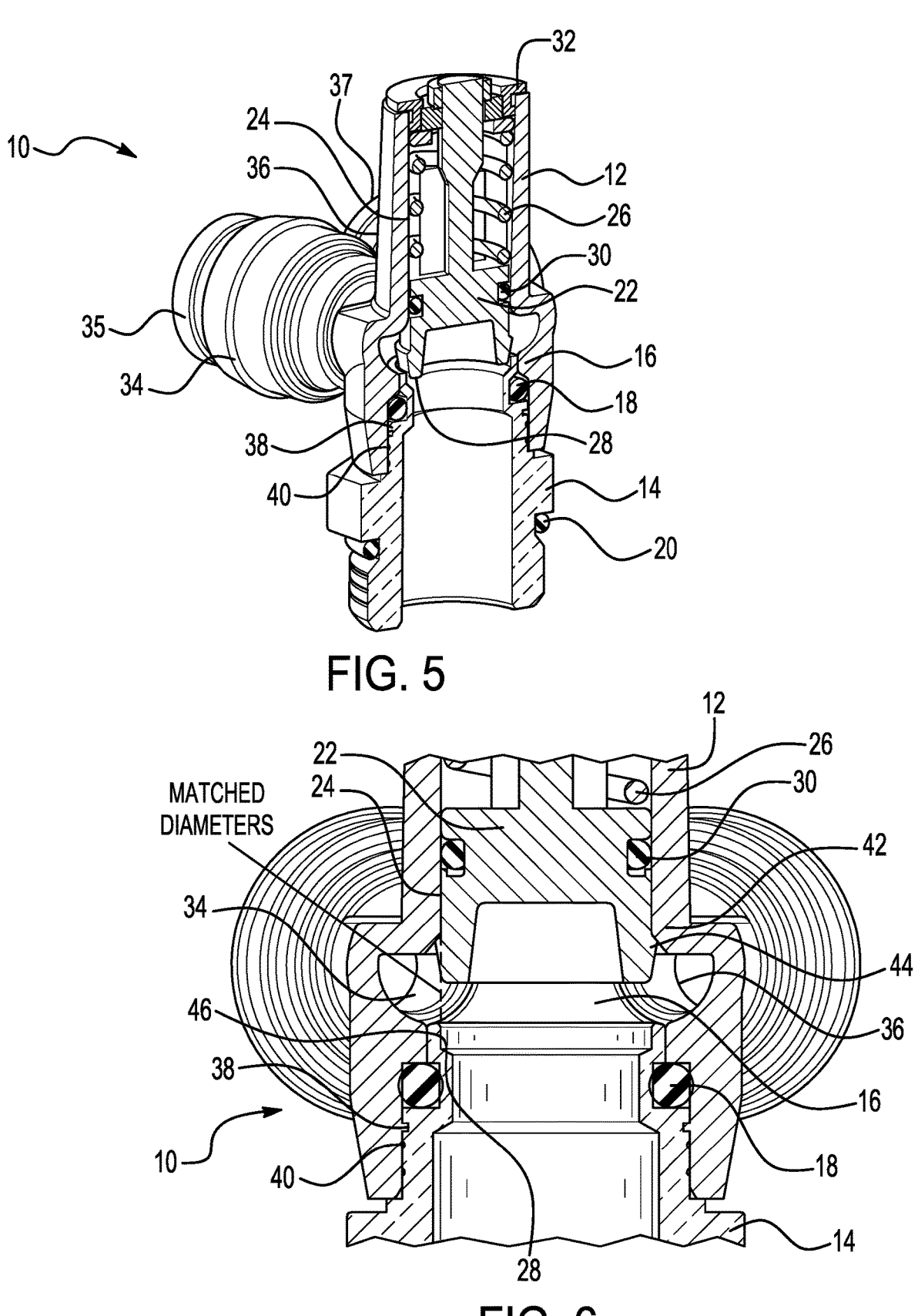
FIG. 5 is a drawing depicting a perspective cross-sectional view of the exemplary pressure protection valve taken along the line A-A shown in FIG. 3.
FIG. 6 is a drawing depicting a close-up view of a portion of the exemplary pressure protection valve derived from FIG. 5.

FIG. 5 is a drawing depicting a perspective cross-sectional view of the exemplary pressure protection valve 10 taken along the line A-A shown in FIG. 3. FIG. 6 is a drawing depicting a close-up view of a portion of the exemplary pressure protection 10 valve as derived from FIG. 5. Performance is enhanced by the molded valve body design allowing the valve stem 22 to be inserted into the valve body 12 from the end with threads 38 at the inlet portion 16 of the valve body prior to connection of the valve base 14. The valve stem being inserted from the threaded end of the valve body also allows for the configuration of the pressure protection valve 10 to have a blow-out proof valve stem, i.e., a configuration that prevents the valve stem from overtravel, or even ejection, oppositely from the inlet portion in the event of an overpressure condition. As best seen in the close-up view of FIG. 6, the valve body 12 includes a hard stop 42, and the valve stem 22 includes a lip 44 that interacts against the hard stop 42 to prevent the valve stem 22 from overtravel in an opening direction opposite from the inlet portion 16 if pressure exceeds the normal working pressure. In other words, if a pressure exceeds the normal working pressure, such interaction of the valve stem lip against the hard stop of the valve body prevents the valve stem from overtravel in the opening direction within the valve body during an overpressure condition. Accordingly, there is an interference surface of the hard stop 42 and lip 44 that prevents the valve stem from overtravel and blow-out.

As an additional feature as shown in the close-up view of FIG. 6, the valve seat surface 28 has an internal side surface 46 that has a diameter that essentially is equal or matched to a diameter of the central bore 24 of the valve body 12 through which the valve stem 22 moves. A benefit of such matched diameter configuration is that the opening pressure and closing pressure of the valve will be as close to each other as is practicable, which reduces damaging hysteresis effects.

During assembly, the compression spring 26 is inserted into the central bore 24 from the threaded end 38 at the inlet portion 16 of the valve body. The valve stem 22 then is inserted through the threaded end/inlet portion 16 of the valve body into the central bore and against the compression spring. The valve body 12 also may be capped with the retaining sleeve 32. After the insertion of the valve stem into the valve body, the valve base 14, which may also include the first O-ring seal 18, is then threaded via the opposing threads 38/40 into the threaded end of the valve body. As referenced above, installing the valve stem from the threaded end of the valve body permits the inclusion of the blow-out prevention features and matched diameters for the valve seat side surface and the valve body bore.

Another aspect of the invention, therefore, is a method of assembling a pressure protection valve. In exemplary embodiments, the method of assembling includes the steps of: forming a valve body defining a central bore and having a plurality of integrated fluid connections, the valve body being made of a first material; inserting a spring into the central bore through a first one of the plurality of integrated fluid connections; inserting a valve stem into the central bore through the first one of the plurality of integrated fluid connections; forming a valve base made of a second material different from the first material; and after inserting the valve stem into the central bore through the first one of the plurality of integrated fluid connections, connecting the valve base to the valve body at the first one of the plurality of integrated fluid connections, the spring biasing the valve stem toward the valve base. During valve operation the valve stem is moveable within the central bore of the valve body between an open position that permits fluid flow from the valve base through at least one additional fluid connection of the plurality of integrated fluid connections and a closed position that blocks fluid flow from the valve base through the at least one additional fluid connection of the plurality of integrated fluid connections, the valve base having a valve seat surface that receives a sealing end of the valve stem when the valve stem is in the closed position. In addition, during a pressure drop below a threshold pressure, the spring bias moves the valve stem to the closed position to maintain pressure at the first one of the plurality of integrated fluid connections (e.g., inlet portion) of the valve body.

The configuration of the pressure protection valve of the present application has advantages over conventional configurations. Fluid connections, which may be push-to-connect fluid connections, are integrated into the plastic valve body with any suitable number and configuration, eliminating the need for a pipe threaded connection. The valve body being injection molded plastic also reduces weight and cost. A threaded valve base being made of metal (e.g., brass) can be easily manufactured with different thread sizes while accommodating the same configuration of plastic valve body, thus providing more versatility in manufacturing the overall valve assembly to accommodate a given application. The valve configuration further provides overpressure protection so as to be blowout-proof, which generally is not a feature of conventional configurations. The valve stem can be installed from the threaded end of the valve body, which provides for the referenced blow-out prevention features and for the referenced side surface of the valve seat and valve bore having equal or matched diameters to reduce hysteresis effects.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressure protection valve comprising:

a valve body defining a central bore and that comprises a plurality of integrated fluid connections, the valve body being made of a first material, a valve base connected to the valve body at a first one of the plurality of integrated fluid connections, the valve base being made of a second material different from the first material;

a valve stem that is moveable within the central bore of the valve body between an open position that permits fluid flow from the valve base through at least one additional fluid connection of the plurality of integrated fluid connections and a closed position that blocks fluid flow from the valve base through the at least one additional fluid connection of the plurality of integrated fluid connections, the valve base having a valve seat that receives a sealing end of the valve stem when the valve stem is in the closed position; and a spring located within the bore opposite from the sealing end of the valve stem relative to the valve seat, and the spring biases the valve stem toward the closed position, wherein a diameter of the central bore is matched to a diameter of an internal side surface of the valve seat; and further comprising a first O-ring seal that seals an interface of the valve body and the valve base, a second O-ring seal that seals an outer surface of the valve base, and a third O-ring that seals an interface of the valve stem and the central bore.

2. The pressure protection valve of claim 1, wherein the valve body includes a hard stop and the valve stem includes a lip that interacts against the hard stop to prevent the valve stem from overtravel in an opening direction.

3. The pressure protection valve of claim 1, wherein the first material includes a plastic material and the second material includes a metal material.

4. The pressure protection valve of claim 1, wherein the first material includes a glass filed nylon material, and/or the second material includes brass.

5. The pressure protection valve of claim 1, wherein the valve body and the valve base include opposing mating threads, and the valve base is threaded into the valve body.

6. The pressure protection valve of claim 1, wherein the at least one additional fluid connection of the plurality of integrated fluid connections comprises multiple integrated fluid connections.

7. The pressure protection valve of claim 1, wherein the at least one additional fluid connection of the plurality of integrated fluid connections comprises a push-to-connect fluid connection.

8. The pressure protection valve of claim 1, further comprising a retaining sleeve that caps the valve body opposite from the valve base.

9. The pressure protection valve of claim 1, wherein the spring is a coil spring.

10. The pressure protection valve of claim 1, wherein the valve base is press-fit onto the valve body.

11. A method of assembling a pressure protection valve comprising the steps of:

forming a valve body defining a central bore and having a plurality of integrated fluid connections, the valve body being made of a first material;

inserting a spring into the central bore through a first one of the plurality of integrated fluid connections;

inserting a valve stem into the central bore through the first one of the plurality of integrated fluid connections;

forming a valve base made of a second material different from the first material; and after inserting the valve stem into the central bore through the first one of the plurality of integrated fluid connections, connecting the valve base to the valve body at the first one of the plurality of integrated fluid connections, the spring biasing the valve stem toward the valve base;

wherein during valve operation the valve stem is moveable within the central bore of the valve body between an open position that permits fluid flow from the valve base through at least one additional fluid connection of the plurality of integrated fluid connections and a closed position that blocks fluid flow from the valve base through the at least one additional fluid connection of the plurality of integrated fluid connections, the valve base having a valve seat that receives a sealing end of the valve stem when the valve stem is in the closed position;

wherein during a pressure drop below a threshold pressure, the spring bias moves the valve stem to the closed position to maintain pressure at the first one of the plurality of integrated fluid connections;

wherein a diameter of the central bore is equal to a diameter of an internal side surface of the valve seat; and capping the valve body with a retaining sleeve opposite from the valve base;

wherein the step of inserting a valve stem into the central bore and the step of capping the valve body with the retaining sleeve provides for spring compression to define the threshold pressure.

12. The method of assembling of claim 11, wherein the valve body and the valve base include opposing mating threads, and connecting the valve base to the valve body comprises threading the valve base into the valve body.

13. The method of assembling of claim 11, wherein forming the valve body comprises injection molding a plastic material to form the valve body, and wherein forming the valve base comprises forming the valve base from a metal material.

14. The method of assembling of claim 13, wherein the plastic material includes glass filled nylon.

15. The method of assembling of claim 13, wherein the metal material includes brass.

16. The method of assembling of claim 11, wherein the valve body includes a hard stop and the valve stem includes a lip that interacts against the hard stop to prevent the valve stem from overtravel in an opening direction.

* * * * *